2,899,268
RECOVERY OF URANIUM FROM AQUEOUS PHOSPHATE-CONTAINING SOLUTIONS

Iver Igelsrud and Elmer F. Stephan, Columbus, Ohio, assignors to the United States of America as represented by the United States Atomic Energy Commission No Drawing. Application March 5, 1952
Serial No. 275,028

16 Claims. (Cl. 23—14.5)

This invention deals with the recovery of uranium from aqueous mineral acid leach solutions obtained from uranium-containing ores, and in particular from uranium-containing phosphatic ores. The invention also deals with the recovery of uranium from aqueous solutions obtained by leaching superphosphates with an aqueous medium.

Monazite sand, apatite, and the so-called Florida phosphate are some examples of the many ores for which the process of this invention is usable. These ores, as well as the superphosphates, a product obtained by treating calcium phosphate ore with sulfuric acid, contain very minor quantities of uranium, a fact which makes its recovery rather difficult.

The ores are usually ground, preferably after calcination at about 950° to 1000° C., and then leached with hot mineral acid. Sulfuric acid having preferably a concentration of from 24 to 72% and phosphoric acid having a concentration of from 40 to 50% are especially suitable for this purpose. In the case of concentrated sulfuric acid a quantity of 500 g. of acid per 200 g. of ground ore yielded good results when leaching was carried out for 3 hours at 200° C. The use of a 24% sulfuric acid, however, required a leaching time of about 6 days. In the case of phosphoric acid, 1000 g. of acid were used for 250 g. of ground ore, and leaching was carried out at 93° C. for 3 hours. The acid solution obtained, while still hot, is separated from any residue prior to subjecting it to further processing.

This mineral acid solution is preferably first cooled in order to cause crystallization of the bulk of monocalcium phosphate. The mother liquor of this step is separated from the crystals, and concentrated sulfuric acid is added to it, whereby calcium sulfate precipitates and a solution of phosphoric acid is obtained. This phosphoric acid solution contains most of the uranium in a relatively low concentration, and, in order to enrich the solution in uranium, it is recycled and brought in contact with new batches of ground ore.

Once the solution has reached the desired concentration, it is branched off the leaching cycle and subjected to the uranium recovery proper. For this purpose, for instance, the solution may be contacted with activated carbon which, it was found, adsorbs practically completely the uranium values, provided the pH value of the solution is at least 2. Gas mask carbon of a particle size of −200 mesh has been used with good results. The uranium can be eluted from the carbon by means of strong acid, e.g. 10 N nitric acid. A combination of adsorption on activated carbon and precipitation with fluoride anions was also found to be satisfactory.

The solution remaining after the adsorption of uranium and which consists mainly of phosphoric acid is then neutralized by adding sodium carbonate thereto, whereby trisodium phosphate is formed. Thus trisodium phosphate may be recovered from the solution by crystallization.

It has also been found that the uranium may be recovered from the enriched phosphoric acid solution, instead of by adsorption on activated carbon, by precipitation with an organic amine. When an amine is added to the phosphoric acid solution, a precipitate forms; this precipitate was found to carry or contain the uranium. When the precipitate was separated from the solution and washed, e.g, with sodium carbonate or sodium hydroxide, the uranium was removed from the precipitate as uranyl carbonate and sodium diuranate, respectively, together with trisodium phosphate. The residue consisted essentially of the free amine. This regenerated amine may be re-introduced into the cycle for precipitating uranium from new quantities of phosphoric acid solution.

It is one object of this invention to provide a process for recovering uranium from mineral acid- and phosphate anion-containing solutions which does not impair the phosphate recovery.

It is another object of this invention to provide a process for the recovery of the uranium contained in superphosphate.

These and other objects are accomplished, according to this invention, by adding an organic amine to the acid, phosphate anion-containing solution of uranium, whereby a precipitate forms which contains the uranium, and separating the precipitate from the supernatant.

A great number of organic amines are suitable for the process of this invention. Amines of a straight-chain hydrocarbon are preferred and among these those having two nitrogen atoms separated by two carbon atoms, for instance, ethylenediamine, diethylenetriamine, triethylenetetramine, and tetraethylenepentamine have given satisfactory results; but also other amines such as lauryl amine acetate, 1-amino pyridine, 2-amino pyridine, hexamethylenetetramine and melamine have proved to be suitable. The very best results were obtained with coconut oil amine sold by Armour and Company under the trade name "Armeen C.D.," which is a mixture of primary amines of aliphatic hydrocarbons, each having an even number of carbon atoms and the bulk of which distills between 210 and 255° C.; approximately one-half (47%) of "Armeen C.D." is n-dodecylamine; it also contains 8% of n-octylamine, 9% of n-decylamine, 18% of n-tetradecylamine, 8% of n-hexadecylamine, 5% of n-octadecylamine and 5% of n-octadecenylamine.

It was quite surprising when it was found that the individual distillation fractions of "Armeen C.D." are by far not as efficient in the process of this invention as is a mixture of the several fractions and that in general crude amine products are superior to the purified ones.

The amine may be added to the uranium-containing solution in the free state or as an acid salt. It may also be used in the form of a solution in mineral or acetic acid.

For complete, or practically complete, uranium recovery a relatively great quantity of the amine is required. While with 100 parts of "Armeen C.D." per 1 part of uranium a precipitation of about 50% of the uranium present was obtained, a removal of above 90% resulted with about 2000 parts of amine per 1 part of uranium. This is not of great import, since the amine is always regenerated and can be recycled repeatedly.

It was found that the acidity of the solution has a great effect on the yield of uranium. For phosphoric acid solutions a pH between 2 and 2.7 was very satisfactory. However, a pH between 2.45 and 2.6 was preferred. Within this optimal pH range the presence of ferrous ions was found to have a beneficial effect on the yield. A yield of 100%, for instance, was obtained with 500 ml. of a phosphoric acid-monocalcium solution containing 5 mg. of uranium to which 1.2 g. of iron powder had been added. The addition of iron powder did not affect uranium precipitation at pH values outside the optimal range of from 2 to 2.7. Examination of the part played by the ferrous ions showed that reduction of hexavalent uranium to the tetravalent state was not brought about.

The acidity best suitable in the case of sulfuric acid solutions was found to be between 0.5 and 2%; in this range almost quantitative precipitation of uranium occurred.

The precipitation with the amine is preferably carried out at room temperature and best accomplished by adding the amine, or amine compound or amine solution, to the uranium-containing solution. Stirring of the mixture for about 15 minutes was found to be advantageous.

The uranium-containing amine precipitate may be separated from the solution by filtration, centrifugation, or any other means known in the art. The uranium may then be eluted from the precipitate by washing it with, for instance, sodium carbonate or sodium hydroxide solution. Good results were also obtained with hydrochloric acid as the eluant. In one instance 100 cc. of a 10% solution of sodium carbonate per 10 g. of amine precipitate proved satisfactory.

The eluate, which contains the uranium in the form of uranyl carbonate, sodium diuranate, or uranium chloride, is then further processed for the purpose of the separation of uranium; this may be done by any means known to those skilled in the art. After the removal of the uranium values, the solution may be subjected to crystallization whereby practically pure trisodium phosphate is obtained.

The remainder of the precipitate is practically free amine. It can be re-used, either as is or it may be dissolved, for instance, in acetic acid and the solution can then be recycled.

In the following example a number of experiments are summarized. This example is given for illustrative purposes only and without the intention to have the scope of the invention limited to the details given therein.

*Example*

A number of tests were carried out with superphosphate leach solutions having different pH values and varying uranium concentrations and with "Armeen C.D." as the precipitant; the amine:uranium ratio was also varied in these experiments. The various conditions and the results obtained thereby are summarized in the following table.

tion whereby the uranium is precipitated, separating the precipitate from said solution, and washing the precipitate with an aqueous solution selected from the group consisting of sodium carbonate solution, sodium hydroxide solution and hydrochloric acid solution whereby the uranium is eluted and the amine regenerated for reuse.

2. The process of claim 1 wherein precipitation is effected at room temperature.

3. The process of claim 1 wherein the mineral acid is phosphoric acid.

4. The process of claim 3 wherein the aqueous solution has a pH value between 2 and 2.7.

5. The process of claim 4 wherein the pH value is between 2.45 and 2.6.

6. The process of claim 4 wherein the solution contains ferrous ions.

7. The process of claim 1 wherein the mineral acid is sulfuric acid.

8. The process of claim 7 wherein the concentration of sulfuric acid ranges between 0.5 and 2%.

9. The process of claim 1 wherein the amine mixture is added in the form of a solution in acid.

10. The process of claim 9 wherein the acid is mineral acid.

11. The process of claim 9 wherein the acid is acetic acid.

12. The process of claim 1 wherein the aqueous medium is a sodium carbonate solution.

13. The process of claim 1 wherein the aqueous medium is a sodium hydroxide solution.

14. The process of claim 1 wherein the aqueous medium is a hydrogen chloride solution.

15. A process of recovering uranium from aqueous sulfuric acid solutions containing hexavalent uranium values and phosphate anions, comprising adjusting the acidity to from 0.5 to 2%; adding to said solution, while it is at room temperature, about 2000 parts per weight of coconut oil amines per 1 part per weight of uranium, said coconut amines being a mixture of primary amines of straight-chain hydrocarbons each having an even number of carbon atoms; separating the precipitate formed from the solution; washing the precipitate with an aqueous, about 10% solution of sodium carbonate whereby uranium is eluted as uranyl carbonate and the phosphate anion as trisodium phosphate and the amines are regenerated for re-use.

16. A process of recovering uranium aqueous phosphoric acid solutions containing hexavalent uranium values, comprising adjusting the pH to from 2.45 to 2.6;

| Experiment | Leach solution | | 1 g. Armeen/400 cc. solution | | 5 g. Armeen/400 cc. solution | | 10 g. Armeen/400 cc. solution | |
|---|---|---|---|---|---|---|---|---|
| | pH | mg. uranium in 400 cc. solution | mg. Armeen per 1 mg. uranium | Percent uranium precipitated | mg. Armeen per 1 mg. uranium | Percent uranium precipitated | mg. Armeen per 1 mg. uranium | Percent uranium precipitated |
| 1 | 2.7 | 2.0 | 500 | 83 | 2,500 | 98 | 5,000 | 100 |
| 2 | 2.6 | 4.5 | 222 | 55 | 1,110 | 76 | 2,220 | 95 |
| 3 | 2.6 | 4.0 | 250 | 69 | 1,250 | 91 | 2,500 | 90 |
| 4 | 2.7 | 4.8 | 208 | 62 | 1,040 | 88 | 2,080 | 90 |

These experiments show that best results are obtained with the more dilute solution with regard to uranium content and that the quantity of amine used should be above 1200, but preferably about 2000 mg. per 1 mg. of uranium for complete precipitation.

It will be understood that this invention is not to be limited to the details given herein but that it may be modified within the scope of the appended claims.

What is claimed is:

1. A process of recovering uranium from aqueous mineral acid solutions containing said uranium in the hexavalent state and phosphate anions, comprising adding a mixture of amines of cocoanut oil acids to said soluadding ferrous ions to said solution; incorporating into said solution, while it is at room temperature, 2000 parts per weight of coconut oil amines per 1 part per weight of uranium, said coconut amines being a mixture of primary amines of straight-chain hydrocarbons each having an even number of carbon atoms; separating the precipitate formed from the solution; washing the precipitate with an aqueous, about 10% solution of sodium carbonate whereby uranium is eluted as uranyl carbonate and the phosphate anion as trisodium phosphate and the amines are regenerated for re-use.

(References on following page)

References Cited in the file of this patent

FOREIGN PATENTS 249,369 Switzerland _____ Apr. 16, 1948

OTHER REFERENCES

Holladay et al.: "Experiments Relative to the Determination of Uranium by Means of Cupferron." Trans. American Electrochemical Society, vol. 43, pp. 329–339 (1923).

Fischer: "Das Verhalten Aliphatischer aminbasen und einiger zyklischen basischen Stickstoffkerne zu metallsalzlosungen," Wissenschaftliche Veroffentlichungen aus dem Siemens-Konzern, vol. 4, part II, page 171–187 (1925).